United States Patent
Jung

(10) Patent No.: US 8,853,941 B2
(45) Date of Patent: Oct. 7, 2014

(54) ORGANIC LIGHT EMITTING DIODE DISPLAY

(71) Applicant: Samsung Display Co., Ltd., Yongin (KR)

(72) Inventor: Youn-Hwan Jung, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/073,646

(22) Filed: Nov. 6, 2013

(65) Prior Publication Data
US 2014/0139984 A1    May 22, 2014

(30) Foreign Application Priority Data
Nov. 16, 2012   (KR) .................. 10-2012-0130355

(51) Int. Cl.
*H01J 1/62*         (2006.01)
*H01J 63/04*        (2006.01)
*G06F 1/16*         (2006.01)

(52) U.S. Cl.
CPC ................................. *G06F 1/1601* (2013.01)
USPC ................... 313/512; 313/504; 313/511

(58) Field of Classification Search
CPC ..................................................... G06F 1/1601
USPC .................... 313/504, 511, 512; 445/24, 25; 428/690; 345/173
See application file for complete search history.

(56) References Cited

U.S. PATENT DOCUMENTS

| | | | |
|---|---|---|---|
| 6,035,180 A * | 3/2000 | Kubes et al. ............... | 455/575.1 |
| 2011/0050657 A1* | 3/2011 | Yamada ........................ | 345/204 |
| 2011/0069027 A1* | 3/2011 | Kim et al. .................... | 345/173 |
| 2012/0049718 A1* | 3/2012 | Watanabe et al. ............ | 313/110 |
| 2013/0002133 A1* | 1/2013 | Jin et al. ...................... | 313/511 |
| 2013/0002572 A1* | 1/2013 | Jin et al. ...................... | 345/173 |
| 2013/0002583 A1* | 1/2013 | Jin et al. ...................... | 345/173 |
| 2014/0002973 A1* | 1/2014 | Lee et al. .................. | 361/679.01 |
| 2014/0065430 A1* | 3/2014 | Yamazaki et al. ............ | 428/426 |
| 2014/0096892 A1* | 4/2014 | Cho et al. ........................ | 156/99 |
| 2014/0118271 A1* | 5/2014 | Lee et al. ...................... | 345/173 |

FOREIGN PATENT DOCUMENTS

| KR | 10-2007-0102160 A | 10/2007 |
|---|---|---|
| KR | 10-0851025 B1 | 8/2008 |
| KR | 10-2009-0006687 A | 1/2009 |
| KR | 10-2010-0018524 A | 2/2010 |

* cited by examiner

*Primary Examiner* — Nimeshkumar Patel
*Assistant Examiner* — Glenn Zimmerman
(74) *Attorney, Agent, or Firm* — Knobbe, Martens, Olson & Bear, LLP

(57) ABSTRACT

An organic light emitting diode (OLED) display is disclosed. In one aspect, the OLED display includes an at least partially curved display panel and a cover window disposed in an external side of the front side of the display panel, and formed in the shape corresponding to the display panel. The OLED display further includes a set frame disposed in an external side of the rear side of the display panel, and coupled with the cover window. The cover window is not made of a single material. That is, portion covering the display panel and a portion coupled to the set frame are made of different materials, respectively.

16 Claims, 12 Drawing Sheets

ORGANIC LIGHT EMITTING DIODE DISPLAY

RELATED APPLICATIONS

This application claims priority to and the benefit of Korean Patent Application No. 10-2012-0130355 filed in the Korean Intellectual Property Office on Nov. 16, 2012, the entire contents of which are incorporated herein by reference.

BACKGROUND

1. Field

The described technology generally relates to an organic light emitting diode (OLED) display.

2. Description of the Related Technology

An OLED display includes a display panel, a cover window, and a set frame. That cover window and the set frame surround the display panel for protection. The display panel includes a plurality of pixels to display an image, and is connected to a printed circuit board to receive a control signal for driving the pixels. The cover window is disposed in an outer side of the front side (i.e., a display side) of the display panel and the set frame is disposed in an outer side of the rear side of the display panel.

SUMMARY

One inventive aspect is an assembly structure of a cover window and a set frame that surround a display panel for protection.

Another aspect is an OLED display of which an assembly structure of a cover window and a set frame is improved to increase coupling strength therebetween, and able to suppress separation of the cover window and the set frame due to external impact and breakage of the display panel.

Another aspect is an OLED display which includes: an at least partially bent display panel; a cover window disposed in an external side of the front side of the display panel, and formed in the shape corresponding to the display panel; and a set frame disposed in an external side of the rear side of the display panel, and coupled with the cover window. The cover window includes a main body covering the display panel and a coupling flange fixed to an edge of the main body, made of a material that is different from the main body, and coupled to the set frame.

The main body may be made of plastic and the coupling flange may be made of metal. The cover window may be manufactured using an insert molding method and thus the main body and the coupling flange may be integrally formed.

The main body may include a flat portion and a pair of curved line portions disposed at both ends of the flat portion along one direction, and the coupling flange may be fixed to an edge of the curved line portion. The display panel may include a display area, and the main body comprises a light transmission portion corresponding to the display area and a light blocking portion disposed in an external side of the light transmission portion.

The coupling flange may include a fixing portion fixed to the main body and a coupling portion protruding toward the set frame from the main body, and the coupling portion may form an opening. The set frame may form an assembling hook in a portion corresponding to the opening in an inner surface that contacts the coupling portion.

The assembling hook may include a pair of supports protruding the coupling portion and a wedge-shaped fixing protrusion formed in an end of each support. The fixing portion may be received in a concave groove formed in the main body or an external surface of the fixing portion may contact an internal surface of the main body such that the fixing portion is fixed to the main body.

Alternatively, the coupling flange may cross the main body at an end of the main body, and an adhesive layer may be provided between the coupling flange and an end of the set frame. The width of the end of the set frame, disposed toward the coupling flange may be the same as the width of the coupling flange.

The OLED display may further include an internal reinforcement member disposed in an inner side of the set frame and formed of a bottom portion and a side wall. The coupling flange may include a fixing portion fixed to the main body and a coupling portion protruding toward the set frame from the main body. The coupling portion may form a female thread portion, and the side wall may be disposed facing the coupling portion.

The set frame may form a bolt head receiving portion and a female thread portion, and the side wall may form a female thread portion. The female thread portion of the set frame, the female thread portion of the coupling portion, and the female thread portion of the side wall may be disposed in a straight line. A coupling bolt may be provided in an outer side of the set frame, and the coupling bolt may be sequentially fastened to the female thread portion of the set frame, the female thread portion of the coupling portion, and the female thread portion of the side wall.

The fixing portion may be received in a concave groove formed in the main body or an external surface of the fixing portion may contact an internal surface of the main body such that the fixing portion is fixed to the main body.

The assembly structure of the cover window and the set frame has excellent workability and does not experience assembly deviation, and the cover window and the set frame are not easily separated from each other when an external impact is applied thereto because they have strong coupling strength. Further, a failure of a display panel due to transmission of external impact can be reduced.

DETAILED DESCRIPTION

An OLED display panel and its cover window may be at least partially bent. For example, each of the display panel and the cover window may form curved line portions in lateral ends thereof along one direction.

In general, the cover window is made of plastic, and assembled to the set frame by being attached thereto using an adhesive tape or adhesive solution at edges of the curved line portions. However, the assemble structure has weak coupling strength so that the cover window and the set frame may be easily separated from each other due to external impact, and the external impact is transmitted to the display panel, thereby causing a failure of the display panel.

Embodiments will be described more fully hereinafter with reference to the accompanying drawings. As those skilled in the art would realize, the described embodiments may be modified in various different ways, all without departing from the spirit or scope of the present invention.

In the specification, unless explicitly described to the contrary, the word "comprise" and variations such as "comprises" or "comprising", will be understood to imply the inclusion of stated elements but not the exclusion of any other elements. In addition, when it is said that any part, such as a layer, film, region, or plate, is positioned on another part, it means the part is directly on the other part or above the other part with at least one intermediate part. Further, in the specification, it means that an upper part of a target portion indicates an upper part or a lower part of a target portion, and it does not mean that the target portion is always positioned at the upper side based on a gravity direction.

Figure 1:
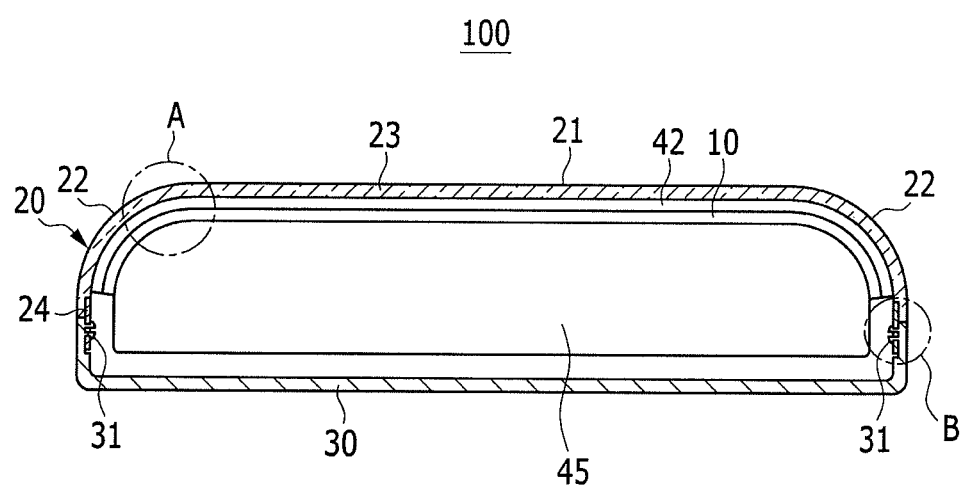
FIG. 1 is a cross-sectional view of an OLED display according to a first exemplary embodiment.
Figure 2:
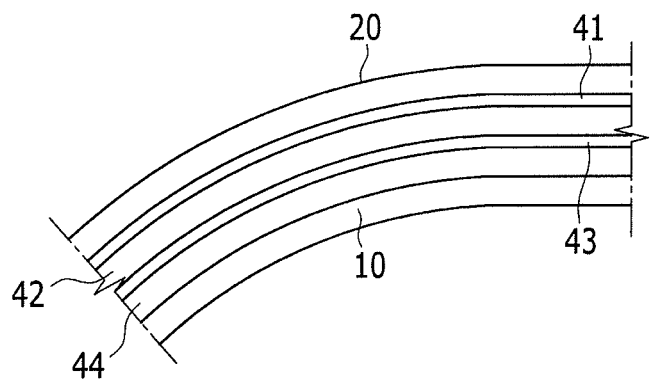
FIG. 2 is a partially enlarged view of "A" in FIG. 1.
Figure 3:
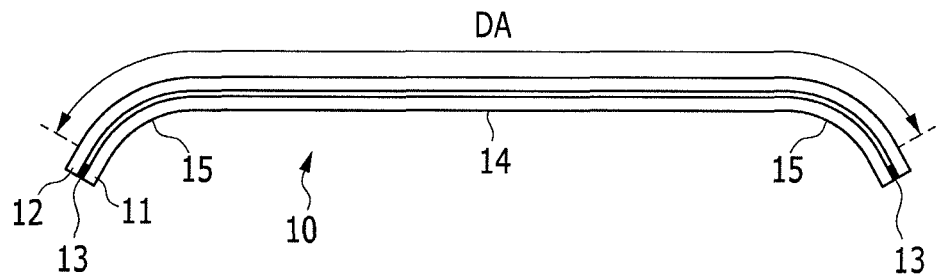
FIG. 3 is a cross-sectional view of a display panel of the OLED display of FIG. 1.

FIG. 1 is a cross-sectional view of an OLED display according to a first exemplary embodiment, FIG. 2 is an enlarged view of "A" of FIG. 1, and FIG. 3 is a cross-sectional view of a display panel of FIG. 1.

Referring to FIG. 1 to FIG. 3, an OLED display 100 includes a display panel 10, a cover window 20 protecting the display panel 10 by covering the same, and a set frame 30. In addition, the OLED display 100 may further include a first adhesive layer 41, a touch sensor 42, a second adhesive layer 43, and a polarization film 44.

The display panel 10 is formed of a flexible display panel. The display panel 10 includes a substrate 11 provided with a display area DA that displays an image and an encapsulation substrate 12 fixed on the substrate 11 to cover the display area DA. In the display area DA, a plurality of signal lines including a plurality of scan lines and a plurality of data lines and a plurality of pixels are provided. In addition, a scan driver (not shown) and a data driver (not shown) are disposed in an outer side of the display area DA on the substrate 11.

The scan driver supplies a scan signal to the pixels through the scan lines, and the data driver supplies a data signal to the pixels through the data lines. Each of the pixels includes an OLED and a driving circuit, and an image is displayed in the display area DA using light emitted from each OLED. A configuration of the pixel circuit and a cross-sectional structure of the OLED will be described later.

The substrate 11 and the encapsulation substrate 12 may be formed of polymer films, and a sealing member 13 is disposed along an edge of the encapsulation substrate 12 to integrally bond the substrate 11 and the encapsulation substrate 12. Alternatively, instead of the encapsulation substrate 12, a thin film encapsulation layer may be disposed on the display area DA. The thin film encapsulation layer may be formed of a structure in which at least one inorganic material layer and at least one organic material layer are alternately layered.

Light generated from the display area DA is transmitted through the substrate 11 or the encapsulation substrate 12 and then emitted to the outside. When the light generated from the display area DA is transmitted through the encapsulation substrate 12, the encapsulation substrate 12 is disposed toward the cover window 20 and thus an external surface of the encapsulation substrate 12, corresponding to the display area DA becomes a display plane of the display panel 10.

When the light generated from the display area DA is transmitted through the substrate 11, the substrate 11 is disposed toward the cover window 20 and an external plane of the substrate 11, corresponding to the display area DA becomes a display plane of the display area DA. FIG. 1 illustrates that the light generated from the display area DA is transmitted through the encapsulation substrate 12 and the cover window 20 and then emitted to the outside.

At least part of the display panel 10 is bent or curved. For example, the display panel 10 includes a flat portion 14 and a pair of curved line portions 15 disposed at lateral ends of the flat portion 14. The display area DA occupies areas excluding the edge of the display panel 10 where the sealing member 13 or wirings are provided, and includes the flat portion 14 and the pair of curved line portions 15.

The cover window 20 is disposed in the external side of a front side (i.e., display side) of the display panel 10, and formed in the shape that corresponds to the display panel 10. That is, the cover window 20 includes a flat portion 21 corresponding to the flat portion 14 of the display panel 10 and a pair of curved line portions 22 corresponding to the curved line portions 15 of the display panel 10.

The first adhesive layer 41, the touch sensor 42, the second adhesive layer 43, and the polarization film 44 may be provided between the cover window 20 and the display panel 10. The touch sensor 42 is attached to the cover window 20 by the first adhesive layer 41, and the display panel 10 to which the polarization film 44 is attached is attached to the touch sensor 42 by the second adhesive layer 43.

The polarization film 44 functions to improve visibility by suppressing reflection of external light. The first and second adhesive layers 41 and 43 may be formed as an optically clear adhesive (OCA). As the cover window 20 and the display panel 10 respectively form the curved line portions 22 and 15, the first adhesive layer 41, the touch sensor 42, the second adhesive layer 43, and the polarization film 44 also form curved line portions.

The set frame 30 is disposed in the external side of a rear side of the display panel 10, and forms the external shape of the OLED display 100 by being assembled with the cover window 20. A printed circuit board transmitting a control signal to the display panel 10, a buffer member absorbing external impact, and various parts (e.g., a battery, a motor, and various sensors) for being operated as a mobile phone or a mobile PC may be provided between the display panel 10 and the set frame 30. FIG. 1 schematically illustrates the part assembly as reference numeral 45.

A part assembly 45 may be disposed at a distance with an inner side of the set frame 30. In this case, a space between the part assembly 45 and the set frame 30 may function as a buffer space for delaying transmission of impact energy due to deformation of the set frame 30 from drop impact.

In the OLED display 100, the cover window 20 may not be formed of a single material. For example, a portion coving the display panel 10 and a portion coupled to the set frame 30 are made of different materials.

Figure 4:
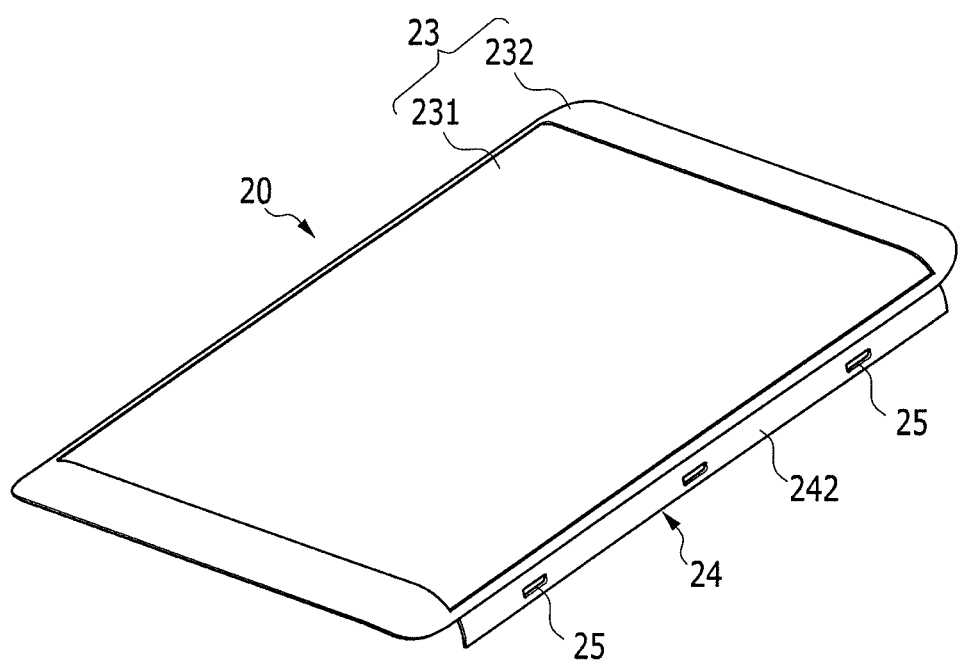
FIG. 4 is a perspective view of a cover window of the OLED display of FIG. 1.
Figure 5:
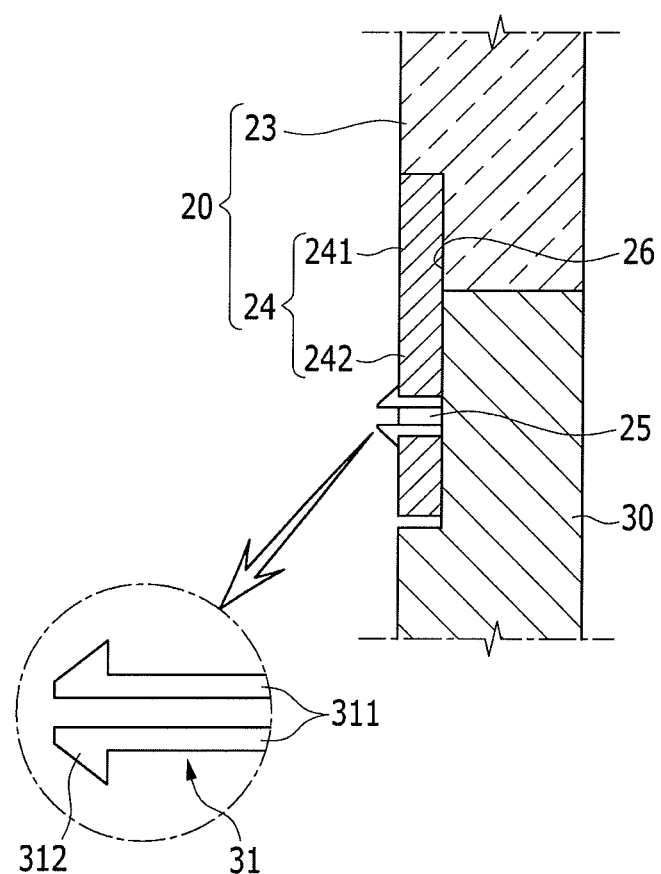
FIG. 5 is an enlarged view of "B" of FIG. 4.

FIG. 4 is a perspective view of the cover window of the OLED display of FIG. 1, and FIG. 5 is an enlarged view of "B" of FIG. 4.

Referring to FIG. 4 and FIG. 5, the cover window 20 includes a main body 23 covering the display panel 10 and a coupling flange 24 fixed to the edge of the main body 23 and coupled to the set frame 30. The main body 23 is made of plastic and the coupling flange 24 is made of a metal having excellent strength than plastic. The cover window 20 is made of an insert molding method and thus the main body 23 and the coupling flange 24 respectively formed of different materials can be integrated to each other.

The main body 23 occupies the entire area of the flat portion 21 and the curved line portions 22 of the cover window 20, and the coupling flange 24 protrudes toward the set frame 30 from the edge of the curved line portions 22. That is, the coupling flange 24 is formed of a fixing portion 241 fixed to the main body 23 and a coupling portion 242 protruding toward the set frame 30 and thus coupled thereto. A plurality of openings 25 are formed in the coupling portion 242 for assembling with the set frame 30.

The main body 23 may include a transmission portion 231 corresponding to the display area DA and a light blocking portion 232 disposed in the external side of the transmission portion 231. The light blocking portion 232 blocks unnecessary light and shields a portion of the display panel 10, which does not display an image. Alternatively, the main body 23 may be formed transparent entirely, rather than forming the blocking portion 232.

The coupling flange 24 may be formed in the shape of a plate having a constant length and width, and may be formed flat or curved with a curvature that is equivalent to that of the curved line portion 22. In one embodiment, the coupling flange 24 is thinner than the main body 23, and the main body 23 may form a concave groove 26 that partially receive the coupling flange 24. The depth of the concave groove 26 may be substantially equal to the thickness of the coupling flange 24, and an inner surface of the coupling flange 24 is disposed in parallel with an inner surface of the main body 23.

The insert molding method is effective in integral manufacturing of a metal and plastic, and a product manufactured using the insert molding method has features of metal, such as strength, conductivity, surface treatment and features of plastic, such as electric insulation, coloring property, flexibility, processability, and the like. In addition, a product manufactured using the insert molding method may have a rational structure because advantages and disadvantages of the two metals are mutual supplementary.

In one embodiment, the cover window 20 is manufactured through a process of ① manufacturing the coupling flange 24 by processing a metal plate, ② mounting a pair of coupling flanges 24 in a mold, and ③ forming the main body 23 by injecting a resin in an empty space in the mold. The cover window 20 manufactured through such a process has high accuracy, and can be prevented from being loosened or detached, thereby providing high reliability.

An inner surface of the set frame 30 at least partially overlaps the coupling portion 242 while contacting an outer surface of the coupling portion 242 at an end disposed toward the coupling flange 24. In this case, a plurality of assembling hooks 31 are formed corresponding to the openings 25 in the end of the set frame 30, and the set frame 30 and the coupling flange 24 are firmly assembled using the assembling hooks 31.

Each assembling hook 31 may include a pair of supports 311 protruding toward the coupling portion 242 and a wedge-shaped fixing protrusion 312 is formed in an end of each support 311. When the assembling hook 31 is entered into the opening 25, the pair of fixing protrusions 312 become close each other due to deformation of the support 311 and thus the assembling hook 31 passes through the opening 25, and the pair of fixing protrusions 312 are fixed to the inner surface of the coupling portion 242 in an air-tight manner while returning back to their original location after the assembling hook 31 passes through the opening 25.

The shape of the assembling hook 31 is not restrictive, and any shape that can be assembled to the opening 25 to fix the coupling portion 242 and the set frame 30 in an air-tight manner is applicable.

Such an assembly structure of the coupling flange 24 and the set frame 30 using the opening 25 and the assembling hook 31 has excellent workability, and does not experience assembly deviation. In addition, the assembly structure has excellent coupling strength so that the cover window 20 and the set frame 30 are not easily separated from each other even through external impact is applied thereto, and a failure of the display panel 10 due to the external impact transmitted thereto can be reduced.

Figure 6:
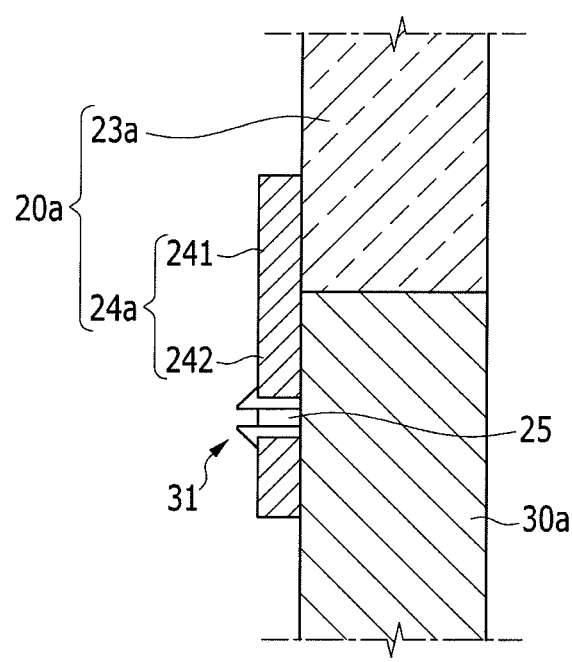
FIG. 6 is a partially enlarged cross-sectional view of a cover window and a set frame of an OLED display according to a second exemplary embodiment.

FIG. 6 is a partially enlarged cross-sectional view of a cover window and a set frame of an OLED display according to a second exemplary embodiment.

The OLED display of the FIG. 6 embodiment is substantially the same as the OLED display of the first exemplary embodiment, except that a concave groove is not formed in a main body 23a of a cover window 20a. The same element as that of the first exemplary embodiment is denoted by the same reference numeral, and a different configuration from that of the first exemplary embodiment will be mainly described below.

In the second exemplary embodiment, the main body 23a of the cover window 20a does not form a concave groove, and an external surface of a fixing portion 241 of a coupling flange 24a contacts an inner surface of the main body 23a such that the coupling flange 24a is fixed to the main body 23a.

In the first exemplary embodiment, the concave groove is formed to receive the coupling portion 242 of the coupling flange 24 to dispose the external surface of the set frame 30 in substantially parallel with the external surface of the cover window 20. However, since the concave groove receiving the coupling portion 242a of the coupling flange 24a is not formed in the set frame 30a, the end of the set frame 30a is formed thick to increase strength of the end thereof.

Figure 7:
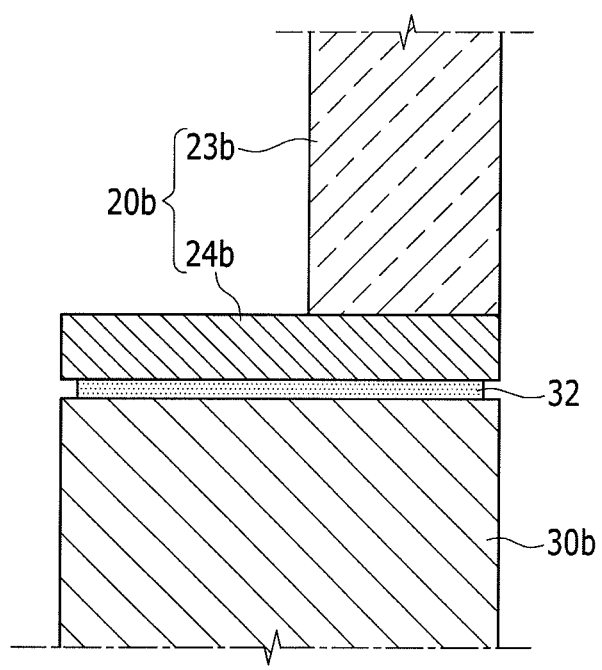
FIG. 7 is a partially enlarged cross-sectional view of a cover window and a set frame of an OLED display according to a third exemplary embodiment.

FIG. 7 is a partially enlarged cross-sectional view of a cover window and a set frame of an OLED display according to a third exemplary embodiment.

The OLED display of the FIG. 7 embodiment is substantially the same as the OLED display of the first exemplary embodiment, except that a cover window 20b and a set frame 30b are coupled using an adhesive layer 32 instead of using an assembling hook.

In the third exemplary embodiment, the coupling flange 24b is fixed to a main body 23b in a crossed manner at an end of the main body 23b, and no opening is formed. The coupling flange 24b may be substantially parallel with a flat portion 14a (refer to FIG. 3) of the display panel 10, and the set frame 30b may be increased in thickness at an end thereof, which faces the cover window 20b such that the width of the end facing the coupling flange 24b may be substantially equal to the width of the coupling flange 24b.

In addition, an adhesive layer 32 is disposed between the coupling flange 24b and the end of the set frame 30b to fix the coupling flange 24b and the set frame 30b. The adhesive layer 32 may be formed using a double-sided adhesive tape. As the coupling flange 24b is formed in the cover window 20b, a contact area of the cover window 20b and the set frame 30b can be increased. Thus, the coupling strength of the cover window 20b and the set frame 30b can be increased using the adhesive layer 32 instead of using the assembling hook.

Figure 8:
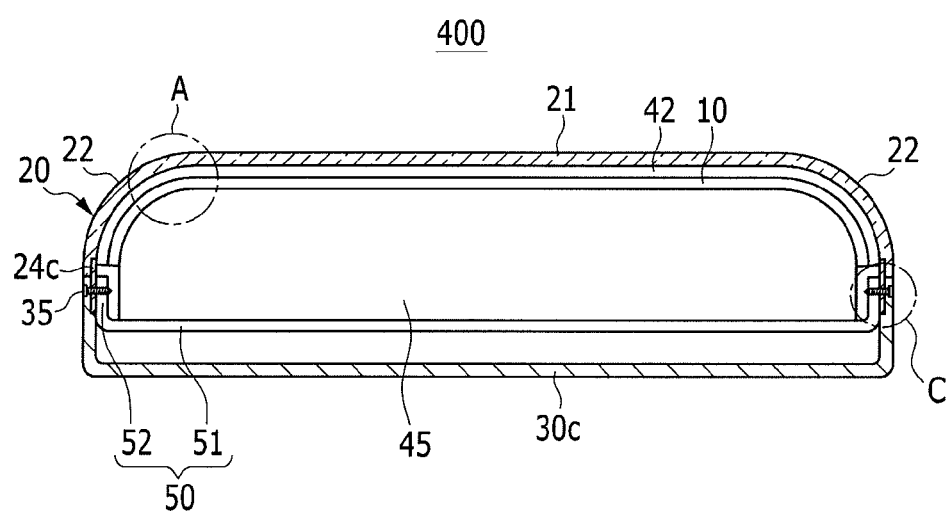
FIG. 8 is a cross-sectional view of an OLED display according to a fourth exemplary embodiment.
Figure 9:
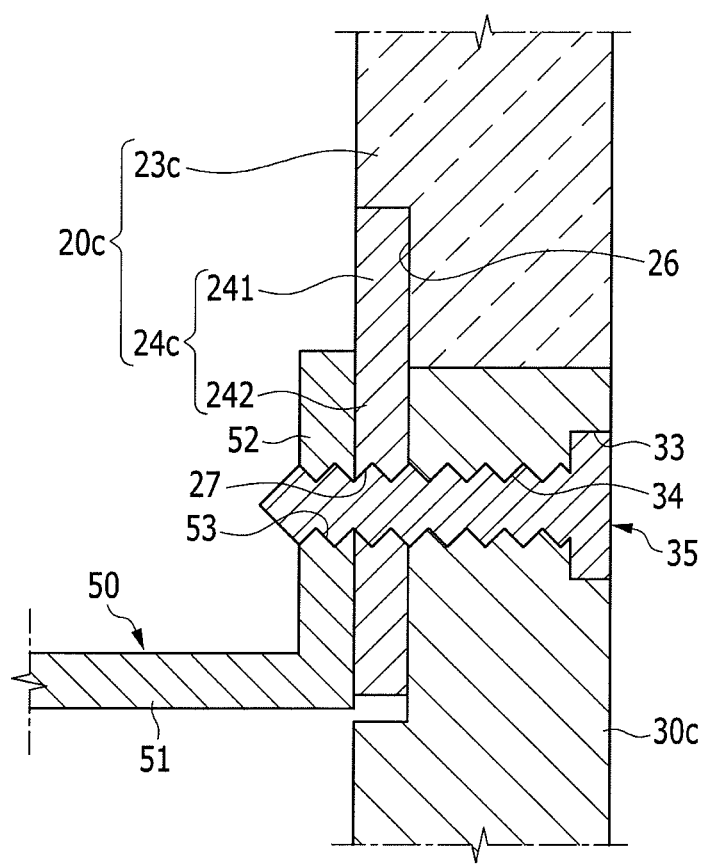
FIG. 9 is an enlarged view of "C" of FIG. 8.

FIG. 8 is a cross-sectional view of an OLED display according to a fourth exemplary embodiment and FIG. 9 is a partially enlarged cross-sectional view of "C" in FIG. 8.

Referring to FIG. 8 and FIG. 9, an OLED display 400 further includes an internal reinforcement member disposed in an inner side of a set frame 30c in addition to the constituent elements of the OLED display of the first exemplary embodiment.

The internal reinforcement member 50 is disposed in a rear side of a display panel 10 and a part assembly 45, and distanced from an inner surface of a set frame 30c. The internal reinforcement member 50 is formed of a bottom portion 51 and a side wall 52 and surrounds rear and side surfaces of the part assembly 45 for protection. The side wall of the internal reinforcement member 50 faces the coupling flange 24c of the cover window 20c, and the internal reinforcement member 50 may be made of metal.

The set frame 30c forms a bolt head receiving portion 33 receiving a bolt head and a female thread portion 34 instead of forming an assembling hook. In addition, female thread portions 27 and 53 are respectively formed in the coupling flange 24c and the side wall 52 of the internal reinforcement member 50. That is, the coupling flange 24c forms the female thread portion 27 instead of forming the opening of the first exemplary embodiment. The female thread portion 34 of the set frame 30c, the female thread portion 27 of the coupling flange 24c, and the female thread portion 53 of the internal reinforcement member 50 are formed in a straight line, and they have the same size.

In addition, a coupling bolt 35 is sequentially fit into the three female thread portions 34, 27, and 53 from an external side of the set frame 30c such that the set frame 30c, the cover window 20c, and internal reinforcement member 50 are coupled with each other. That is, the set frame 30c, the cover window 20c, and the internal reinforcement member 50 are tightly coupled with each other by the coupling bolt 35. In this case, the main body 23c of the cover window 20c forms a concave groove 26 to receive a fixing portion 241 of the coupling flange 24c.

The OLED display 400 enhances reinforcement function in an inner side of the set frame 30c by having the internal reinforcement member 50. In addition, in the OLED display 400, the coupling strength of the cover window 20c, the set frame 30c, and the internal reinforcement member 50 can be increased by fixing the side wall 52 of the internal reinforcement member 50 to the cover window 20c and the set frame 30c using the coupling bolt 35.

Figure 10:
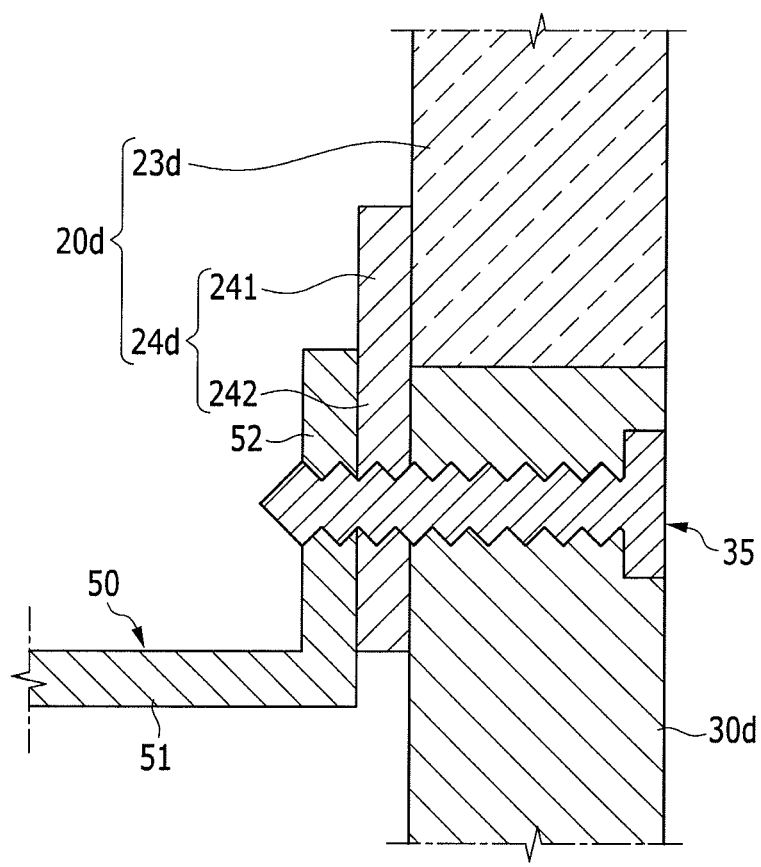
FIG. 10 is a partially enlarged cross-sectional view of a cover window and a set frame of an OLED display according to a fifth exemplary embodiment.

FIG. 10 is a partially enlarged cross-sectional view of a cover window, a set frame, and an internal reinforcement member of an OLED display according to a fifth exemplary embodiment.

The OLED display of the FIG. 10 embodiment is substantially the same as the OLED display of the fourth exemplary embodiment, except that a concave groove is not formed in a main body 23d of a cover window 20d. The same element as that of the fourth exemplary embodiment is denoted by the same reference numeral, and a different configuration from that of the fourth exemplary embodiment will be mainly described below.

In the fifth exemplary embodiment, the main body 23d of the cover window 20d does not form a concave groove, and an external surface of a fixing portion 241 of a coupling flange 24d contacts an internal surface of the main body 23d such that the coupling flange 24d is fixed to the main body 23d. Unlike in the fourth exemplary embodiment, a concave groove receiving a coupling portion 242 of the coupling flange 24d is not formed in the fifth exemplary embodiment, and therefore an end of the set frame 30d can be formed thick, thereby increasing strength of the end.

Figure 11:
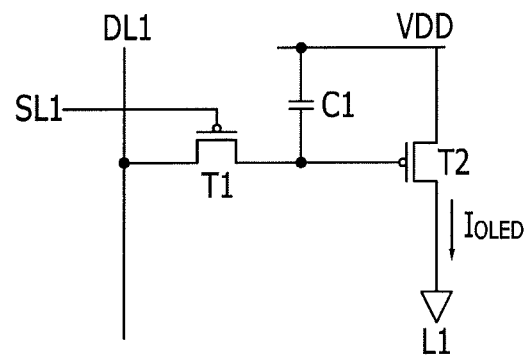
FIG. 11 shows a pixel circuit of the display panel of FIG. 1.
Figure 12:
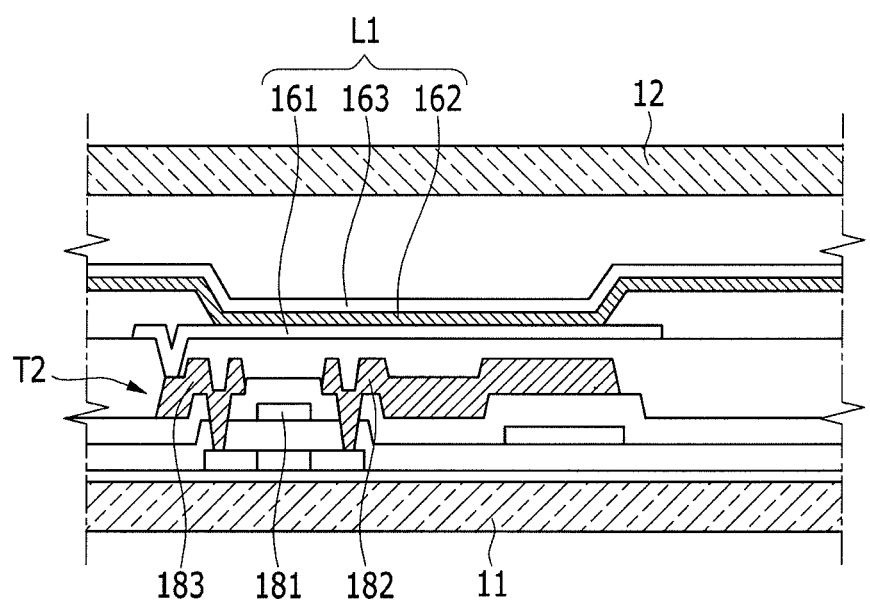
FIG. 12 is a partially enlarged cross-sectional view of the display panel of FIG. 1.

FIG. 11 shows a pixel circuit of the display panel of FIG. 1 and FIG. 12 is partially enlarged cross-sectional of the display panel of FIG. 1.

Referring to FIG. 11 and FIG. 12, a pixel includes an OLED L1 and driving circuits T1, T2, and C1. The OLED L1 includes a pixel electrode 161, an organic emission layer 162, and a common electrode 163. The driving circuits T1, T2, and C1 include at least two thin film transistors (i.e., a switching transistor T1 and a driving transistor T2) and at least one capacitor C1.

The switching transistor T1 is connected to a scan line SL1 and a data line DL1, and transmits a data voltage, input from a data line DL1 according to a switching voltage input to the scan line SL1, to the driving transistor T2. The capacitor C1 is connected to the switching transistor T1 and a power source line VDD, and stores a voltage corresponding to a difference between a voltage transmitted from the switching transistor T1 and a voltage supplied to the power source line VDD.

The driving transistor T2 is connected to the power source line VDD and the capacitor C1 to supply an output current $I_{OLED}$ proportional to a square of a difference between the voltage stored in the capacitor C1 and a threshold voltage to the organic light emitting diode L1, and the organic light emitting diode L1 emits light with intensity proportional to the output current $I_{OLED}$. The driving transistor T2 includes a gate electrode 181, a source electrode 182, and a drain electrode 183, and a pixel electrode 161 may be connected to the drain electrode 183 of the driving transistor T2.

The cross-sectional structures of the pixel circuit of FIG. 11 and the OLED display of FIG. 12 are not limited thereto, and the OLED display of the present exemplary embodiment can be variously deformed.

While the above embodiments have been described in connection with the accompanying drawings, it is to be understood that the invention is not limited to the disclosed embodiments, but, on the contrary, is intended to cover various modifications and equivalent arrangements included within the spirit and scope of the appended claims.

What is claimed is:

1. An organic light emitting diode (OLED) display comprising:
    a display panel being at least partially curved, wherein the display panel has front and rear sides opposing each other;
    a cover window disposed in an external side of the front side of the display panel, and having a shape corresponding to the display panel; and
    a set frame disposed in an external side of the rear side of the display panel, and coupled to the cover window,
    wherein the cover window comprises,
    a main body covering the display panel and
    a coupling flange fixed to an edge of the main body and coupled to the set frame, wherein the coupling flange is formed of a material different from the main body.

2. The OLED display of claim 1, wherein the main body is formed of plastic and wherein the coupling flange is formed of metal.

3. The OLED display of claim 2, wherein the main body and the coupling flange are integrally formed.

4. The OLED display of claim 1, wherein the main body comprises a flat portion and a pair of curved line portions disposed at both ends of the flat portion along a -direction, and wherein the coupling flange is fixed to an edge of the curved line portion.

5. The OLED display of claim 4, wherein the display panel comprises a display area, and wherein the main body comprises a light transmission portion corresponding to the display area and a light blocking portion disposed in an external side of the light transmission portion.

6. The OLED display of claim 4, wherein the coupling flange comprises a fixing portion fixed to the main body and a coupling portion protruding toward the set frame from the main body, and the coupling portion forms an opening.

7. The OLED display of claim 6, wherein the set frame forms an assembling hook in a portion corresponding to the opening in an inner surface that contacts the coupling portion.

8. The OLED display of claim 7, wherein the assembling hook comprises a pair of supports protruding the coupling portion and a wedge-shaped fixing protrusion formed in an end of each support.

9. The OLED display of claim 6, wherein the fixing portion is received in a concave groove formed in the main body or an external surface of the fixing portion contacts an internal surface of the main body such that the fixing portion is fixed to the main body.

10. The OLED display of claim 4, wherein the coupling flange crosses the main body at an end of the main body, and wherein an adhesive layer is provided between the coupling flange and an end of the set frame.

11. The OLED display of claim 10, wherein the width of the end of the set frame, disposed toward the coupling flange, is substantially the same as the width of the coupling flange.

12. The OLED display of claim 4, further comprising an internal reinforcement member disposed in an inner side of the set frame and formed of a bottom portion and a side wall.

13. The OLED display of claim 12, wherein the coupling flange comprises a fixing portion fixed to the main body and a coupling portion protruding toward the set frame from the main body, wherein the coupling portion forms a female thread portion, and wherein the side wall is disposed facing the coupling portion.

14. The OLED display of claim 13, wherein the set frame forms a bolt head receiving portion and a female thread portion, wherein the side wall forms a female thread portion, and wherein the female thread portion of the set frame, the female thread portion of the coupling portion, and the female thread portion of the side wall are disposed in a straight line.

15. The OLED display of claim 14, wherein a coupling bolt is provided in an outer side of the set frame, and wherein the coupling bolt is sequentially fastened to the female thread portion of the set frame, the female thread portion of the coupling portion, and the female thread portion of the side wall.

16. The OLED display of claim 13, wherein the fixing portion is received in a concave groove formed in the main body or an external surface of the fixing portion contacts an internal surface of the main body such that the fixing portion is fixed to the main body.

* * * * *